(12) United States Patent
Klug

(10) Patent No.: US 10,005,389 B2
(45) Date of Patent: Jun. 26, 2018

(54) INDICATING APPARATUS

(71) Applicant: AUDI AG, Ingolstadt (DE)

(72) Inventor: Markus Klug, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 30 days.

(21) Appl. No.: 15/170,580

(22) Filed: Jun. 1, 2016

(65) Prior Publication Data

US 2016/0355130 A1 Dec. 8, 2016

(30) Foreign Application Priority Data

Jun. 5, 2015 (DE) .................. 10 2015 007 240

(51) Int. Cl.
| | |
|---|---|
| *B60Q 9/00* | (2006.01) |
| *B60K 35/00* | (2006.01) |
| *B60K 37/02* | (2006.01) |

(52) U.S. Cl.
CPC .............. *B60Q 9/00* (2013.01); *B60K 35/00* (2013.01); *B60K 37/02* (2013.01)

(58) Field of Classification Search
CPC ........... B60Q 9/00; B60K 35/00; B60K 37/02
USPC .................... 340/487; 116/303, 43
See application file for complete search history.

(56) References Cited

U.S. PATENT DOCUMENTS

| | | | | |
|---|---|---|---|---|
| 4,871,995 | A * | 10/1989 | Hoang .................. | B60Q 1/50 116/303 |
| 6,570,628 | B1 | 5/2003 | Hirano | |
| 2005/0253775 | A1 | 11/2005 | Stewart | |
| 2015/0073623 | A1* | 3/2015 | Zhang .................. | G09F 13/16 701/2 |

FOREIGN PATENT DOCUMENTS

| | | |
|---|---|---|
| DE | 197 14 301 A1 | 6/1999 |
| DE | 103 31 131 A1 | 1/2005 |
| DE | 10 2005 017 556 A1 | 10/2006 |
| DE | 10 2005 045 607 A1 | 4/2007 |
| DE | 197 53 928 B4 | 4/2008 |
| DE | 10 2010 053 344 A1 | 6/2012 |
| DE | 10 2012 010 679 A1 | 12/2013 |
| DE | 10 2015 007 240.4 | 12/2016 |
| EP | 0 424 074 A2 | 4/1991 |

OTHER PUBLICATIONS

German Office Action dated Jan. 29, 2016 from German Patent Application No. 10 2015 007 240.4, 6 pages.
Office Action dated Feb. 26, 2018, in corresponding Chinese Patent Application No. 201610390666.1, 8 pgs.

* cited by examiner

*Primary Examiner* — Daryl Pope

(74) *Attorney, Agent, or Firm* — Staas & Halsey LLP

(57) ABSTRACT

A plurality of indicator field elements and a mechanical device are included in an indicating apparatus disposed in an interior of a motor vehicle. Each indicator field element is bounded by an edge, wherein the mechanical device is configured to position the indicator field elements in at least two positions relative to one another and to arrange at least two indicator field elements directly next to one another in at least one position. The edges of the at least two indicator field elements arranged directly next to one another contact at a common boundary in the at least one position and form a common indicator field which comprises the at least two indicator field elements.

20 Claims, 4 Drawing Sheets

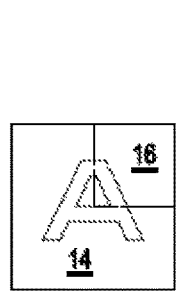
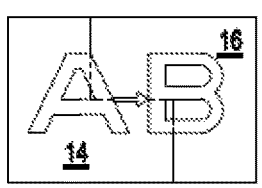
Fig. 5 a
Fig. 5 b
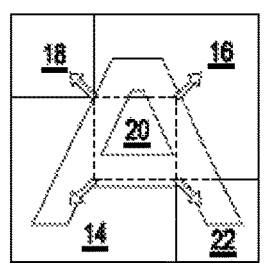
Fig. 5 c
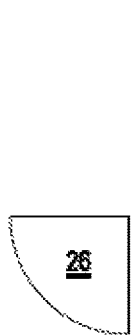
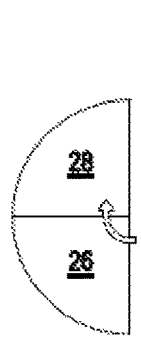
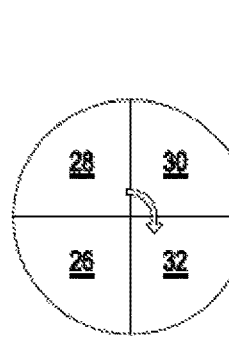
Fig. 6 a
Fig. 6 b
Fig. 6 c

INDICATING APPARATUS

CROSS REFERENCE TO RELATED APPLICATIONS

This application claims the priority benefit of German Application No. 10 2015 007 240.4 filed on Jun. 5, 2015, in the German Patent and Trademark Office, the disclosure of which is incorporated herein by reference in its entirety.

BACKGROUND

Described herein are an indicating apparatus for an interior of a motor vehicle and a method for operating an indicating apparatus.

An indicator field or display can be used for displaying information in an interior of a motor vehicle. When installing such an indicator field, the size thereof and an available installation space in the interior of the motor vehicle need to be balanced. Thus, a large indicator field requires a large footprint, whereas a small indicator field has a small footprint. However, a large indicator field can only be installed if enough installation space is available therefor.

An instrument cluster for use in a motor vehicle is described in document DE 103 31 131 A1. This instrument cluster includes at least one first indicating module, which is embodied as a round, analog pointer instrument, and a second indicating module for displaying symbols. Here, the at least one indicating module is movable relative to the second indicating module.

A multiple indicating apparatus is described in document DE 10 2005 045 607 A1; it has respectively two round pointer instruments, which are arranged in front of an indicator field and are displaceable relative thereto and also relative to one another.

An indicating apparatus for a vehicle known from document DE 10 2005 017 556 A1 is movable back and forth between two positions. Here, the indicating area is concealed by an interior component of the vehicle in a first position, whereas the indicating area is completely visible in the second position.

SUMMARY

The indicating apparatus described herein is provided for an interior of a motor vehicle and includes a plurality of indicator field elements and a mechanical device. Here, each indicator field element is bounded by an edge. The mechanical device is embodied to position the indicator field elements in at least two positions relative to one another and to arrange at least two indicator field elements directly next to one another in an adjacent fashion in at least one position, wherein edges of the at least two indicator field elements arranged directly next to one another in an adjacent fashion contact flush at a common boundary in the at least one position and form a common and coherent indicator field which includes the at least two indicator field elements. In general, the at least two indicator elements arranged directly adjacently to one another are arranged in a plane.

The mechanical device generally includes a motor and a plurality of actuating members, wherein at least one indicator field element is connected to at least one actuating member, wherein the indicator field elements should be moved between the positions relative to one another by way of the mechanical device. Here, the indicator field elements should be moved indirectly by way of the actuating members in the case of a movement of the motor.

In one refinement, at least one indicator field element has an edge with at least one straight section or a straight border and/or an edge with at least one section curved in circular fashion or a border curved in circular fashion. Accordingly, it is possible for at least one indicator field element to have a polygonal shape, generally an n-polygonal or quadrangular shape, for example a rectangular or square shape. Furthermore, it is possible for at least one indicator field element to have a circular-sector-shaped embodiment, with the edge or contour thereof having a circular section and two straight sections.

Moreover, edges of at least two indicator field elements have sections which fit to one another with mutually fitting contours. In general, at least one first indicator field element has at least one section or at least one contour at the edge thereof, which is embodied to fit to at least one section or at least one contour of an edge of at least one second indicator field element. These at least two indicator field elements are arranged flush next to one another along the sections embodied to fit to one another, like parts of a puzzle.

In a refinement like in the key-and-lock principle, the at least one section or the at least one contour of the edge of the at least one first indicator field element is embodied along the common boundary of two indicator field elements as a flush fitting counterpart to, and/or negative form of, the at least one section or the at least one contour of the edge of the at least one second indicator field element, and vice versa. This also applies to the case where the at least one section of the edge of both indicator field elements is embodied as a straight border. If the at least one section of the edge of the first indicator field element has a convex embodiment, e.g. a circular convex embodiment, the at least one section of the edge of the second indicator field element has a concave embodiment, e.g. a circular concave embodiment. The sections of the edges of both indicator field elements are embodied as circular arcs with the same radii.

The indicator field elements have light-emitting diodes, e.g. organic light-emitting diodes (OLEDs), for displaying indicator content. The indicator field elements are usually embodied as thin films with light-emitting diodes.

The indicating apparatus also includes a monitoring device embodied to monitor a movement, to be carried out by the mechanical device, of at least one indicator field element between two positions.

The method described herein is provided for operating an indicating apparatus for an interior of a motor vehicle, the indicating apparatus including a plurality of indicator field elements and a mechanical device. Here, each indicator field element is bounded by an edge. The indicator field elements are positioned relative to one another in at least two positions by the mechanical device, wherein at least two indicator field elements are arranged directly next to one another in an adjacent manner in at least one position, usually in a common plane, wherein edges of the at least two indicator field elements arranged directly next to one another in an adjacent manner contact flush at a common boundary in the at least one position and, in the usually one common plane, form a common overarching and coherent indicator field which includes the at least two indicator field elements.

Here, the two indicator field elements arranged directly next to one another in an adjacent manner are connected to one another flush at a common boundary in the at least one position.

In the method, at least one indicator field element is moved in translational fashion, i.e., it is displaced linearly, relative to another indicator field element and/or it is moved in rotational fashion, usually rotated along a circular path, relative to another indicator field element.

At least one indicator field element, usually a visible side of this at least one indicator field element, is concealed by another indicator field element in one position, wherein at least two indicator field elements are usually arranged behind one another in two planes arranged parallel to one another.

In one refinement, an indicator content arching over all indicator field elements is depicted on the visible sides of all indicator field elements arranged next to one another in the common plane.

Accordingly, all indicator field elements are arranged next to one another in a further position while forming the common, coherent indicator field.

An indicator content to be displayed by the indicating apparatus is flexibly adapted to a size of the indicator field in a respective position of the indicator field elements. To the extent that the indicator field is only formed from one indicator field element in one position, this provides a smaller indicating area than in a second position, in which all indicator field elements are arranged next to one another and, compared with the first position, provide a larger indicating area.

By combining the indicator field elements thereof, the indicating apparatus presented here is flexibly arrangeable and/or extendable. Here, a size of the indicator field can be varied by combining the indicator field elements, wherein, inter alia, an indicator field has with a minimum indicating area, which is usually formed by only one indicator field element, or a maximum indicating area, wherein this maximum indicating area should be set by combining and arranging all indicator field elements next to one another.

Here, a plurality of small indicator field elements or displays can be assembled to form a coherent group by way of translational movements, rotational movements and/or a combination of translational and rotational movements.

By using films for providing the indicator field elements, these can be embodied to be comparatively thin and freely cuttable in respect of the edge thereof. Such films include light-emitting diodes, e.g. organic light-emitting diodes, for displaying indicator content.

By flexible arrangement of the indicator field elements relative to one another, different shapes and sizes are obtainable for an indicator field of the indicating apparatus. Here, an area and/or an indicating region of the indicating apparatus are variable. In one position, the indicating apparatus includes a minimum indicating area, which is usually to be provided by only one indicator field element which, in this position, conceals the other indicator field elements.

If a larger indicating area is required, at least one indicator field element, which was previously arranged behind another indicator field element, should be moved relative to and arranged next to the latter. Here, the indicator field elements should be arranged next to one another in any combination.

In the position with the minimum indicating area, a plurality of indicator field elements should be arranged in a plurality of planes arranged parallel to one another. As an alternative thereto, a plurality of indicator field elements should be arranged next to one another in a common plane in the position with the maximum indicating area. By way of the mechanical device, the indicator field elements should be moved relative to one another between individual positions along free or predefined paths. Furthermore, it is also possible for two indicator field elements, which are initially arranged at a distance from one another, to be arranged next to one another, brought together by the mechanical device.

If a plurality of indicator field elements are arranged in a group in one position, the indicating area for an indicator content to be indicated should be adapted to a size of the common, coherent indicator field in a respective position. Usually, the indicator field elements are combinable relative to one another in different positions, wherein a respectively resultant indicator field has a corresponding indicating area.

Such an indicating apparatus is usually to be arranged in an instrument panel of the motor vehicle. Furthermore, it is conceivable to arrange such an indicating apparatus in a steering wheel impact absorber and design it like a so-called Fletcher table. Here, circular indicator field elements with different radii should be provided in two positions.

Since at least two indicator field elements have at least respectively one interlocking section of the edge or a contour which fits to the other one, with the section of an indicator field element being embodied as counterpart to the other indicator field element, these should be combined in different positions like a puzzle piece, wherein, overall, they form a coherent indicator field with a coherent indicating area in each case. Here, it is possible that a section of one indicator field element touches a section of the other indicator field element in a counterpart-like and fitting manner and/or engages into the latter in a fitting manner.

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 5a to 5c are a schematic illustration of an embodiment of the indicating apparatus;

FIGS. 6a to 6c are a schematic illustration of an embodiment of the indicating apparatus.

DETAILED DESCRIPTION OF THE PREFERRED EMBODIMENT

Figure 1:
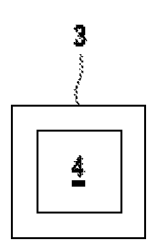
FIGS. 1a to 1c are a schematic illustration of an embodiment of the indicating apparatus according to an embodiment of the method described herein.
Figure 1:
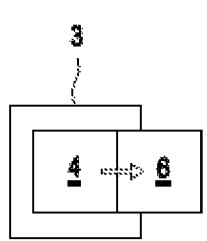
Figure 1:
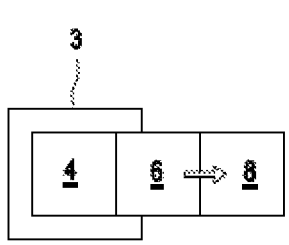
Figure 2:
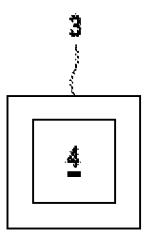
FIGS. 2a to 2c are a schematic illustration of an embodiment of the indicating apparatus according to an embodiment of the method described herein.
Figure 2:
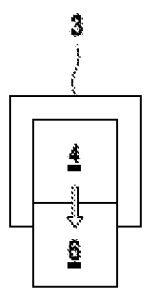
Figure 2:
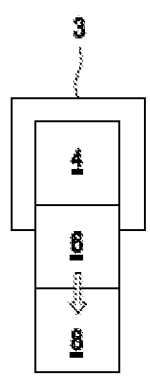
Figure 3:
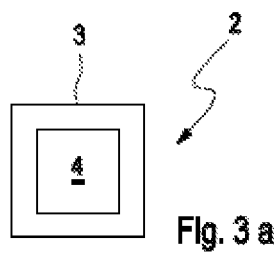
FIGS. 3a to 3b are a schematic illustration of an embodiment of the indicating apparatus according to an embodiment of the method described herein.
Figure 3:
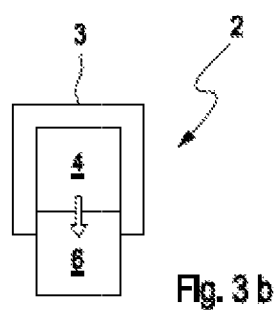
Figure 3:
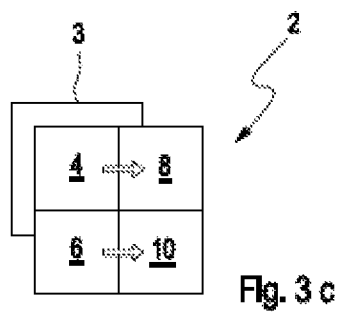
Figure 4:
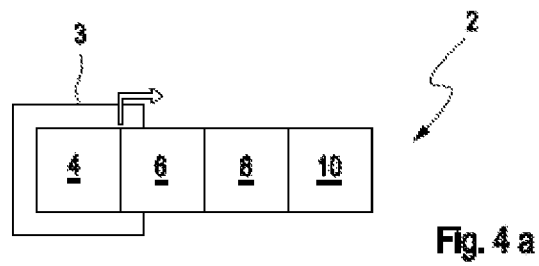
FIGS. 4a to 4b are a schematic illustration of an embodiment of the indicating apparatus according to an embodiment of the method described herein.
Figure 4:
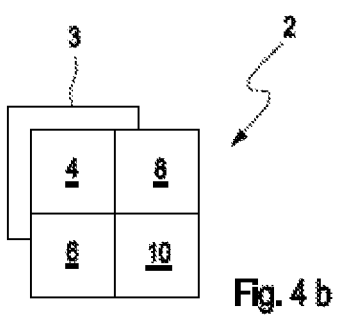

Reference will now be made in detail to the preferred embodiments, examples of which are illustrated in the accompanying drawings, wherein like reference numerals refer to like elements throughout. It is to be understood that the features specified herein are usable not only in the combination specified in each case, but also in other combinations or on their own, without departing from the scope of the disclosure.

An embodiment of the indicating apparatus 2 depicted in FIGS. 1a through 4b includes four indicator field elements 4, 6, 8, 10 and a mechanical device 3 for moving these indicator field elements 4, 6, 8, 10 relative to one another between different positions. To this end, the mechanical device 3 includes a motor and a plurality of actuating members, wherein the motor is connected here to an indicator field element 4, 6, 8, 10 by way of an actuating member in each case. Here, all indicator field elements 4, 6, 8, 10 have a square embodiment and the same indicating area.

In this embodiment of the indicating apparatus according to an embodiment of the method, the indicating apparatus is depicted in a first position in FIG. 1a, in a second position in FIG. 1b and in a third position in FIG. 1c. Here, only a first indicator field element 4 is visible in the first position of the indicating apparatus 2 since all further indicator field elements 6, 8, 10 are arranged concealed behind this first indicator field element 4 (FIG. 1a). Here, the first indicator field element 4 is arranged in a first plane. The further indicator elements 6, 8, 10 are arranged in at least one further plane, which is arranged parallel to the first plane.

A second position of the indicating apparatus 2 is shown in FIG. 1b. Here, this can be reached by a horizontal translational movement of a second indicator field element 6 relative to the first indicator field element 4 by way of the mechanical device 3, which is clarified in FIG. 1b by an arrow. Here, the second indicator field element 6, which was previously still concealed by the first indicator field element 4, is pushed out of concealment by the mechanical device 3 and arranged directly next to the first indicator field element 4. For the purposes of providing a common indicator field, two straight borders of the two indicator field elements 4, 6, which are directly adjacent next to one another, are arranged flush next to one another, wherein these indicator field elements 4, 6 are arranged in a common plane.

Proceeding from the second position (FIG. 1b), the third position indicated in FIG. 1c can also be provided for the indicating apparatus 2. To this end, a third indicator field element 8 should be displaced in the horizontal direction by translation relative to the two other indicator field elements 4, 6 by way of the mechanical device 3, as indicated by an arrow, wherein the third indicator field element 8 is arranged directly next the second indicator field element 6. Here, immediately adjacent straight borders of these two indicator field elements 6, 8 contact flush. Accordingly, a plurality of indicator field elements 4, 6, 8 are arranged horizontally next to one another in a plane in an embodiment of the method.

As shown by an embodiment of the method, it is likewise possible to arrange a plurality of indicator field elements 4, 6, 8 of the indicating apparatus 2 above one another and therefore vertically in relation to one another. Here, FIG. 2a only shows the first indicator field element 4, which conceals the further indicator field elements 6, 8, 10 in the position shown in FIG. 2a. In order to reach a second position, which is depicted schematically in FIG. 2b, the second indicator field element 6 is displaced in the vertical direction to the first indicator field element 4 by the mechanical device 3 and it is arranged flush vertically therebelow, as indicated by an arrow in FIG. 2b. Furthermore, the third indicator field element 8 is displaced by the mechanical device 3 relative to the other two indicator field elements 4, 6 for providing a third position, as indicated in FIG. 2c; this is likewise indicated by an arrow. Hence, three indicator field elements 4, 6, 8 are arranged vertically above one another in a plane here.

As shown schematically in FIG. 3a, only the first indicator field element 4 is visible in a first position of the indicating apparatus 2 according to an embodiment of the method, wherein the other indicator field elements 6, 8, 10 are arranged concealed below the first indicator field element 4. For the purposes of providing a second position, the second indicator field element 6 is displaced relative to the first indicator field element 4 in the vertical direction by translation by way of the mechanical device 3 and arranged directly below the first indicator field element, as indicated in FIG. 3b, wherein both indicator elements 4, 6 are arranged in a plane. Furthermore, provision is made for the third indicator field element 8 to be arranged in a concealed manner below the first indicator field element 4 and for a fourth indicator field element 10 to be arranged in a concealed manner below the second indicator field element 6 in this second position, wherein the third indicator field element 8 and fourth indicator field element 10 are arranged in a plane which is arranged parallel to the plane in which the first indicator field element 4 and the second indicator field element 6 are arranged.

The third position of the indicating apparatus 2 when carrying out this embodiment of the method is depicted schematically in FIG. 3c and should be obtained by displacing the third indicator field element 8 and the fourth indicator field element 10 relative to the first indicator field element 4 and the second indicator field element 6 by way of the mechanical device 3, wherein the third indicator field element 8 and the fourth indicator field element 10 should be displaced relative to the first indicator field element 4 and the second indicator field element 6, as indicated by two arrows in FIG. 3c. In this embodiment of the method, the indicator field elements 4, 6, 8, 10 are displaced relative to one another in a combined manner in the vertical direction and horizontal direction and they are arranged flush next to one another in the same plane.

In an embodiment of the method, all indicator field elements 4, 6, 8, 10 are arranged next to one another in a plane in the horizontal direction. Moreover, provision is made for the first indicator field element 4 and the second indicator field element 6, which are connected to one another, to be displaced relative to the third indicator field element 8 and the fourth indicator field element 10 by way of the mechanical device 3, as indicated in FIG. 4a by a cornered arrow. As a result, a second position of the indicating apparatus 2, which is indicated in FIG. 4b, could be achieved within the scope of this embodiment, wherein the four indicator field elements 4, 6, 8, 10, like in the case of FIG. 3c, form a square indicator field overall and are arranged next to one another in a plane.

In an embodiment of the indicating apparatus 12, the indicating apparatus 12 includes five indicator field elements 14, 16, 18, 20, 22 which, within the scope of the method described herein, assume a first position (FIG. 5a), a second position (FIG. 5b) and a third position (FIG. 5c) relative to one another. Here, provision is made for a first indicator field element 14 and a second indicator field element 16 to each have an L-shaped embodiment. A third, fourth and fifth indicator field element 18, 20, 22 each has a square embodiment. Moreover, mechanical device (not depicted in any more detail here) includes a motor and a plurality of actuating members, wherein one actuating member in each case connects one indicator field element 14, 16, 18, 20, 22 with the motor.

In the first position (FIG. 5a), the second indicator field element 16 is concealed by the first indicator field element 14 apart from a square region. In this first position, the further indicator field elements 18, 20, 22 are completely concealed by the two other indicator field elements 14, 16. In the first position, the two indicator field elements 14, 16 form an indicator field with a square footprint, on which an "A" is depicted here as indicator content. For the purposes of providing the second position (FIG. 5b), the second indicator field element 16 should be displaced relative to the first indicator field element 14 by way of the mechanical device, which is indicated in FIG. 5b by an arrow.

In the second position, the two indicator field elements 14, 16 are arranged next to one another in a common plane like a puzzle piece and form a common interlocking and/or fitting boundary. Here, an indicator field to be provided by the two indicator field elements 14, 16 in the second position has a rectangular embodiment. The letters "AB" are depicted thereon as indicator content.

For the purposes of providing the third position (FIG. 5c), the first indicator field element 14 and the second indicator field element 16 should be displaced at an angle to one another by way of the mechanical device. Moreover, a third, fourth and fifth indicator field element 18, 20, 22 should each be arranged immediately adjacent to the first indicator field element 14 and the second indicator field element 16 in each case by using the mechanical device, wherein the fourth indicator field element 20 is completely surrounded by the first indicator field element 14 and the second indicator field element 16. In the third position, the indicating apparatus 12 has a square indicating area, wherein all indicator field elements 14, 16, 18, 20, 22 are arranged in a plane.

The indicating apparatus 24 depicted in FIGS. 6a to 6c includes four indicator field elements 26, 28, 30, 32, which each have a circular-segment-shaped embodiment. Here, each one of these indicator field elements 26, 28, 30, 32 includes two straight borders arranged at right angles with respect to one another and one border curved in circular fashion. Moreover, the indicating apparatus 24 includes a mechanical device (not depicted in any more detail here) including a motor and a plurality of actuating members, wherein in each case one indicator field element 26, 28, 30, 32 is connected to the motor by way of an actuating member.

Only a first indicator field element 26 arranged in a first plane is visible in a first position (FIG. 6a) of the indicating apparatus 24 since, in the first position, the other indicator field elements 28, 30, 32 are arranged concealed behind the first indicator field element 26 in further planes which are parallel to the first plane. For the purposes of providing a second position (FIG. 6b), a second indicator field element 28 should be rotated relative to the first indicator field element 26 by way of the mechanical device, as indicated here by a curved arrow. In the second position, the two indicator field elements 26, 28 arranged adjacent to one another form a semicircle within one plane. For the purposes of providing a third position, as is depicted schematically in FIG. 6c, a third and a fourth indicator field element 30, 32 are rotated relative to the first indicator field element 26 and the second indicator field element 28 by way of the mechanical device, as indicated by a curved arrow. In the third position, the indicating apparatus 24 has a circular indicator field overall.

Figure 7:
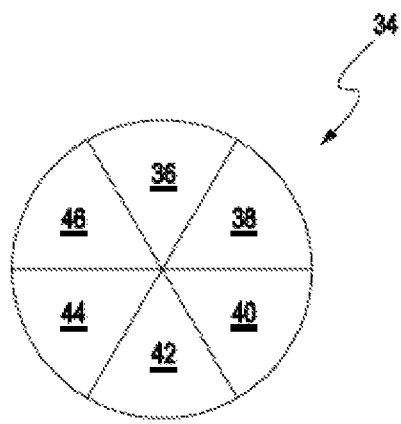
FIGS. 7a to 7b are a schematic illustration of an embodiment of the indicating apparatus.
Figure 7:
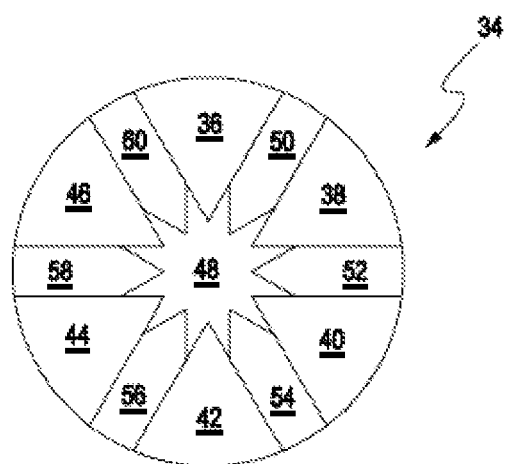

The indicating apparatus 34 depicted in two different positions in FIGS. 7a and 7b includes a total of 13 indicator field elements 36, 38, 40, 42, 44, 46, 48, 50, 52, 54, 56, 58, 60 and a mechanical device (not depicted in any more detail here). Here, a first, second, third, fourth, fifth and sixth indicator field element 36, 38, 40, 42, 44, 46 each has a circular-segment-shaped embodiment and each includes two straight borders, which intersect at an angle of 60° at the tip of each indicator field element, and a circular border. In the first position (FIG. 7a), the first six indicator field elements 36, 38, 40, 42, 44, 46 form a circular indicator field, where in each case a straight border of an indicator field element 36, 38, 40, 42, 44, 46 is arranged adjoining a straight border of an immediately adjacently arranged indicator field element 36, 38, 40, 42, 44, 46 in a fitting and flush manner. Moreover, the tips of all indicator field elements 36, 38, 40, 42, 44, 46 touch at a central center point of the indicating apparatus 34 in the first position.

For the purposes of providing the second position of the indicating apparatus 34, as indicated in FIG. 7b, the first six indicator field elements 36, 38, 40, 42, 44, 46 are moved outward in the radial direction from a central center point of the indicating apparatus 34 by way of the mechanical device. In so doing, an initially still concealed seventh indicator field element 48, which has a star-shaped embodiment here, emerges. Moreover, an indicator field element 50, 52, 54, 56, 58, 60, which is arrow-shaped here, is arranged between in each case two indicator field elements 36, 38, 40, 42, 44, 46 with a circular-segment-shaped embodiment by way of the mechanical device. In the second position, the indicating apparatus 34 has the form of a Fletcher table.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d870, 69 USPQ2d1865 (Fed. Cir. 2004).

What is claimed is:

1. An indicating apparatus disposed in an interior of a motor vehicle, comprising:
    indicator field elements, including a first indicator field element and a second indicator field element, arrangeable in at least a first arrangement and a second arrangement; and
    a mechanical device configured to change an arrangement of the indicator field elements from the first arrangement to the second arrangement by moving the first indicator field element from a first position, in which at least a portion of the first indicator field element is disposed behind the second indicator field element, to a second position in which the first indicator field element is in a same plane as the second indicator field element and at least one edge of the first indicator field element contacts flush at a common boundary with at least one edge of the second indicator field element so as to form a common indicator field.

2. The indicating apparatus according to claim 1, wherein the mechanical device includes a motor and actuating members,
    at least one indicator field element is connected to at least one actuating member, and
    the indicator field elements are moved between the first arrangement and the second arrangement via the at least one actuating member of the mechanical device.

3. The indicating apparatus according to claim 1, wherein at least one indicator field element has an edge with at least one straight section.

4. The indicating apparatus according to claim 1, wherein at least one indicator field element has an edge with at least one curved section.

5. The indicating apparatus according to claim 1, wherein edges of at least two indicator field elements adjacent to one another have sections which interlock so that the sections are flush with one another.

6. The indicating apparatus according to claim 1, wherein the indicator field elements include light-emitting diodes.

7. The indicating apparatus according to claim 1, further comprising a monitoring device configured to monitor a movement of at least one indicator field element between two positions.

8. A method for operating an indicating apparatus disposed in an interior of a motor vehicle, the method comprising:
provi ding an indicating apparatus including indicator field elements arrangeable in at least a first arrangement and a second arrangement, the indicator field elements including a first indicator field element and a second indicator field element;
moving the first indicator field element from a first position, in which at least a portion of the first indicator field element is disposed behind the second indicator field element, to a second position in which the first indicator field element is in a same plane as the second indicator field element and at least one edge of the first indicator field element contacts flush at a common boundary with at least one edge of the second indicator field element so as to form a common indicator field.

9. The method according to claim 8, wherein the first and second indicator field elements are connected to one another at the common boundary in the second arrangement.

10. The method according to claim 8, wherein the moving comprises moving the first indicator field element is moved in a translational fashion relative to the second indicator field element.

11. The method according to claim 8, wherein the moving comprises moving the first indicator field element is moved in a rotational fashion relative to the second indicator field element.

12. The method according to claim 8, wherein
at least one other indicator field element is concealed by the first indicator field element in at least one of the first and second arrangements, and
the at least one other indicator field element and the first indicator field element are arranged behind one another in respective planes arranged parallel to one another in at least one of the first and second arrangements.

13. The method according to claim 8, further comprising adapting an indicator content according to a size of the common indicator field formed by the indicator field elements, the size of the common indicator field being determined based on a positional relationship between each of the indicator field elements in the first and second arrangements.

14. An indicating apparatus disposed in an interior of a motor vehicle, comprising:
indicator field elements moveable between a first arrangement of indicator field elements and a second arrangement of indicator elements, such that in the first arrangement at least two indicator field elements are arranged behind a first indicator field element in respective planes arranged parallel to one another and the first indicator field element is configured to display content; and
a mechanical device configured to move the indicator field elements from the first arrangement to the second arrangement so that at least one of the two indicator field elements arranged behind the first indicator field element is moved to a same plane as the first indicator field element to form a common indicator field having a displayable area for the content that is greater than a displayable area for the content than the first indicator field in the first arrangement.

15. The indicating apparatus of claim 14, wherein in the second arrangement a size of the displayable area for the content is twice as great as a size of the displayable area for the content in the first arrangement.

16. The indicating apparatus of claim 14, wherein the at least two indicator field elements arranged behind the first indicator field element have a different shape than the first indicator field element.

17. The indicating apparatus of claim 14, wherein
in the first arrangement a first plurality of indicator field elements are arranged to form a first common indicator field configured to display the content, and
the mechanical device moves the indicator field elements from the first arrangement to the second arrangement by moving the first plurality of indicator field elements radially outward so that a second plurality of indicator field elements arranged behind the first plurality of indicator field elements are moved to a same plane as the first plurality of indicator field elements to form a second common indicator field having a displayable area for the content that is greater than a displayable area for the content than the first common indicator field.

18. The indicating apparatus of claim 14, wherein at least one edge of the at least one of the two indicator field elements is arranged flush with at least one edge of the first indicator field element to form the common indicator field.

19. The indicating apparatus of claim 1, wherein
each of the indicator field elements includes light-emitting diodes configured to display content,
in the second arrangement, content is visible in a first area of the first indicator field element and a second area of the second indicator field element, and
in the first arrangement, content is visible in the second area of the second indicator field element and not the first area of the first indicator field element.

20. The indicating apparatus of claim 1, wherein
each of the indicator field elements are configured to electronically display information, and
and at least two of the indicator field elements have a same size and a same area.

* * * * *

UNITED STATES PATENT AND TRADEMARK OFFICE
CERTIFICATE OF CORRECTION

| | |
|---|---|
| PATENT NO. | : 10,005,389 B2 |
| APPLICATION NO. | : 15/170580 |
| DATED | : June 26, 2018 |
| INVENTOR(S) | : Markus Klug |

It is certified that error appears in the above-identified patent and that said Letters Patent is hereby corrected as shown below:

In the Claims

Column 9, Line 27:
In Claim 10, after "element" delete "is moved".

Column 9, Line 31:
In Claim 11, after "element" delete "is moved".

Column 10, Line 51:
In Claim 20, before "at" delete "and".

Signed and Sealed this
Thirteenth Day of November, 2018

Andrei Iancu
*Director of the United States Patent and Trademark Office*